Jan. 16, 1934.  E. HOPKINSON  1,943,436
MANUFACTURE OF FILAMENTARY MATERIAL
Filed Dec. 23, 1930  2 Sheets-Sheet 1
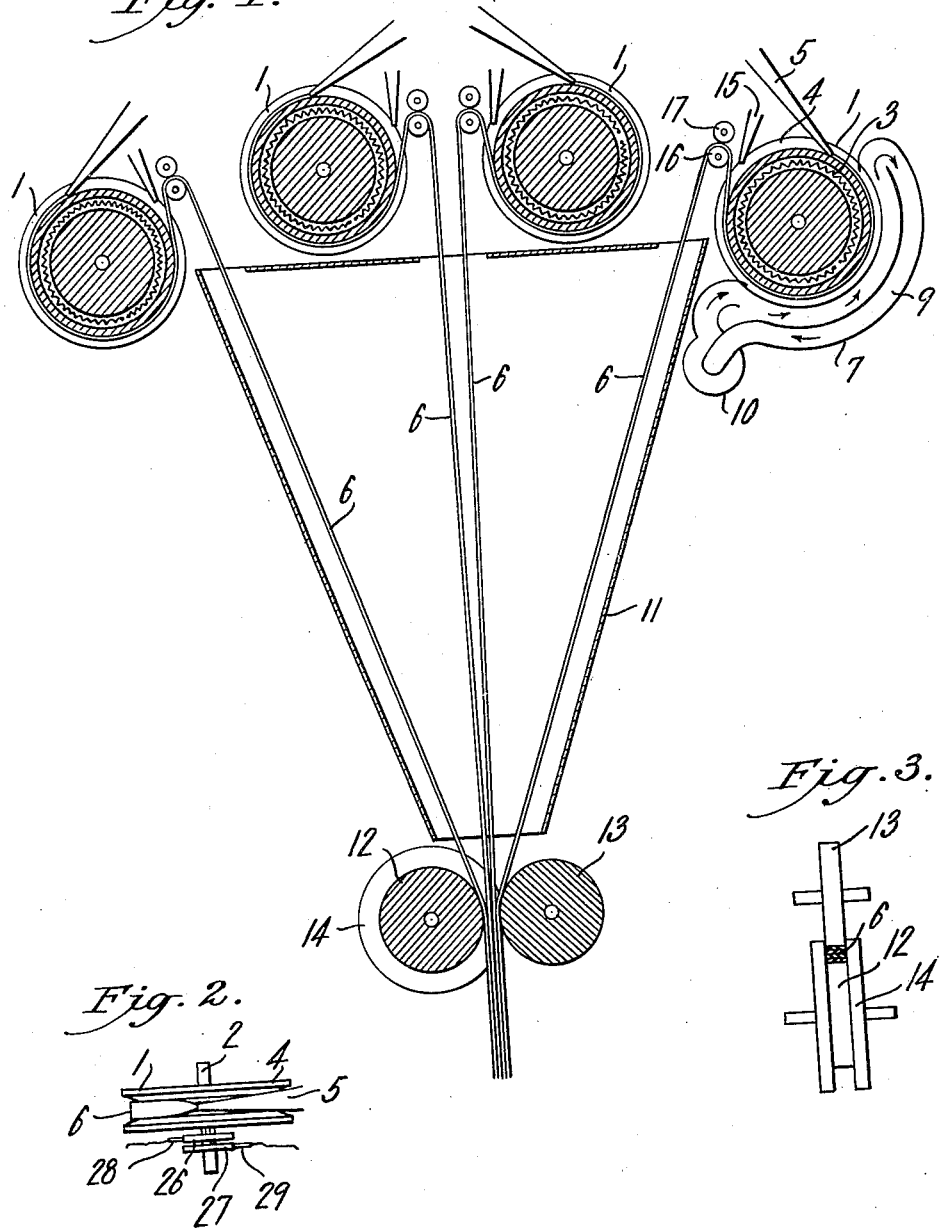
INVENTOR
ERNEST HOPKINSON
BY
ATTORNEY Jan. 16, 1934.  E. HOPKINSON  1,943,436
MANUFACTURE OF FILAMENTARY MATERIAL
Filed Dec. 23, 1930  2 Sheets-Sheet 2
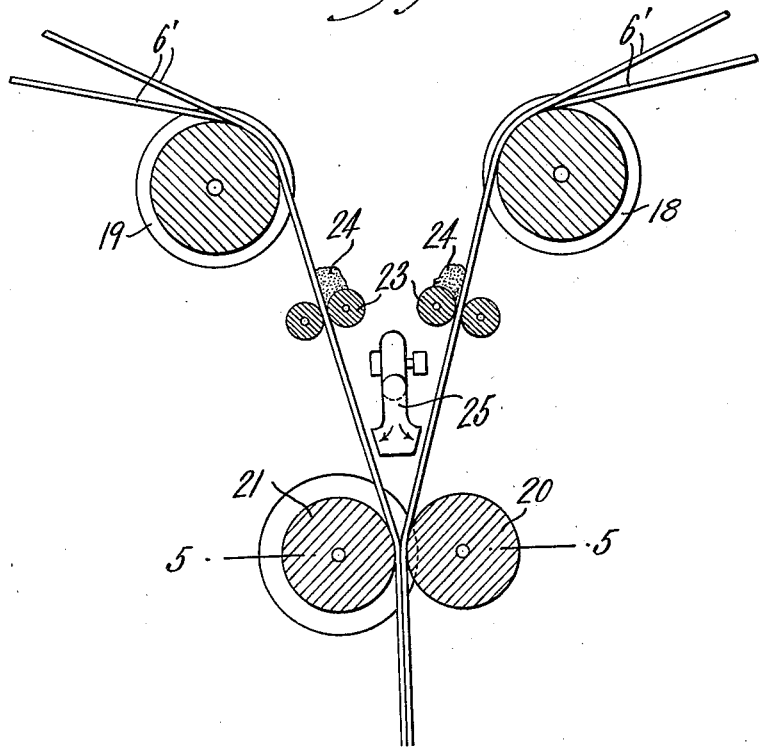
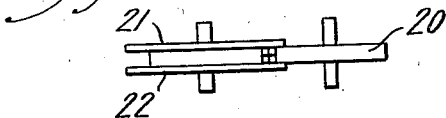
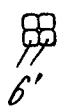
INVENTOR
ERNEST HOPKINSON
BY
ATTORNEY Patented Jan. 16, 1934

1,943,436

UNITED STATES PATENT OFFICE 1,943,436

MANUFACTURE OF FILAMENTARY MATERIAL

Ernest Hopkinson, New York, N. Y., assignor to National India Rubber Company, Providence, R. I., a corporation of Rhode Island Application December 23, 1930, Serial No. 504,237
Renewed August 24, 1933

8 Claims. (Cl. 18—54)

The invention relates to the manufacture of rubber threads and has for an object the production of rubber or rubber-like material of this character in a manner which is simple and commercially practicable and which is superior to present methods in that it eliminates the delay usually required in drying and curing the rubber stock and facilitates production of threads on a continuous basis.

Further objects and advantages of the invention will more clearly appear when reference is had to the following specification and drawings:

In the drawings:

Fig. 1 is a side elevational view with parts in section of an apparatus by means of which the novel process may be carried out.

Fig. 2 is a plan view of one of the wheels upon which the threads or sheets are formed.

Fig. 3 is a plan view of the thread or sheet uniting means shown in section in Fig. 1.

Fig. 4 is an elevation, partly in section, of another appartus by means of which thread material may be associated together from filaments of rubber.

Fig. 5 is a view taken along line 5—5 of Fig. 4.

Fig. 6 is an enlarged section of a plurality of filaments united together in the form of a thread.

The novel process may be carried out by the apparatus shown in Fig. 1 wherein a number of wheels 1 are mounted on suitable bearings and supports. Each wheel is provided with a guide 4 which in this instance is a flange on the wheel. The wheels illustrated are provided with flat channels with sloping sides but it is understood that the shape of this channel may be altered as desired without departing from the principles of the invention, and that what I term "wheels" may be in the form of cylindrical drums without any channel at all so long as some kind of guides like flanges 4 are provided, or they may be drums with a spiral groove of sufficient length to dry and properly condition the filaments which are to be deposited therein. The term "grooved surface" as used herein is intended to include surfaces provided with guides as well as channelled surfaces, and the term "grooves" is intended to include the depression made either by providing the surface with guides or by channelling such surface.

Nozzles 5 are suitably supported to supply some form of rubber dispersion and deposit same on the drying wheels 1. Preferably the nozzles are so supported that they will at all times be in contact with the surface of the drying wheels, the guides 4 performing the function of properly positioning the nozzles and keeping them in alignment with the planes of the wheels on which the deposit is desired. Fig. 2 shows the association of one wheel and nozzle.

Into each wheel is built heating means 7 such as the electrical resistance 3, which is connected to contact rings 26 and 27 on the surface of which contact brushes or strips 28 and 29 are arranged to slide during rotation of the wheels and the strips are connected to suitable sources of electrical energy. Nozzles 15 direct blasts of cold air from a suitable source onto the surface of the drum at a point where the coagulated and dried film formed as hereinafter explained is taken therefrom between rollers 16 and 17. Around each forming wheel 1 is provided heating means 7 which may be in the form of an arcuate chamber provided with passages therein through which hot air may be circulated by means of a blower 10 which should preferably actuate the air in a direction opposite to that which the wheels are rotated. Return passage 9 may be provided to take the remaining hot air back into the blower.

In operation the process proceeds as follows: The rubber dispersion in the form, for instance, as latex is fed through nozzles 5 on to the rotating drying surfaces of wheels 1 and are immediately subjected to the drying action of the inner heating coils 3 and the outer hot air circulation of means 7. After having travelled about three-quarters of the way around the drum the rubber material is dried or coagulated sufficiently to allow it to be led between rollers 16 and 17 and through cooling chamber 11 into pressure rolls 12 and 13, the former being provided with a flange 14 to form a channel for the filaments. At the point where the material leaves wheels 1 a blast of cold air may be directed in order to facilitate removal. As the material passes through the cooling chamber it becomes relatively stiff and dry but still adhesive and is made ready to be operated upon by forming rolls 12 and 13. These rolls laminate a plurality of rubber filaments formed as above described into a rubber thread which in the instance typified takes the form indicated in section in Fig. 3.

Round rubber filaments made as above described but with semi-circular channels on the surfaces of wheels 1, or as made in accordance with my copending application Serial No. 504,236, filed December 23, 1931, by depositing successive layers of a rubber dispersion in semi-circular grooves provided on continuously progressing drying surfaces such as drying drums, may be associated together in the form of a thread in the manner indicated in Fig. 4. Drums 18 and 19 laterally align two such filaments and direct them through doctor rolls 23 to forming rolls 20 and 21 where they are squeezed together in the general form indicated in Fig. 6. The doctor rolls apply a suitable rubber cement or a viscous form of rubber dispersion 24 onto the formed filaments so as to render them more easily and effectively associated together. Air blast 25 may be provided to direct a current of air against each pair of filaments as they approach the forming rolls.

In the manufacture of the completed thread as indicated in Figs. 2 and 6, it is desirable to incorporate various parts of vulcanizing compounds so that when the material is brought together the various increments of the complete vulcanizing compounds migrate or diffuse into the adjacent rubber material and combine with the increments already in said material to form low temperature vulcanizing compounds in accordance with the invention comprised within the patent to Sidney M. Cadwell, No. 1,777,960, issued Oct. 7, 1930.

If desired, a strip of material may be manufactured in the manner described in connection with the exemplification of Figs. 1 and 2 and the subsequent laminated strip cut into threads of suitable size and cross section.

The rubber thread manufactured in accordance with Figs. 4, 5 and 6 effects a saving over rubber threads made in accordance with known processes of manufacture. In the ordinary thread the entire cross section is continuous and the whole thread is solid within the boundaries of the particular cross sectional contour given. With the thread made with a non-solid cross section it is easily seen that the structural strength is provided by the flattened sides of the individual filaments integrally united together, and that the rounded corners and central aperture effects a considerable saving of material when manufactured in quantity. It is easily seen that such a product is one which has a greater length per pound of rubber than solid threads of the same general shape.

Having thus described my invention, what I claim and desire to protect by Letters Patent is:

1. Process for making rubber thread which comprises depositing a rubber dispersion in separate grooves, withdrawing moisture from the separate deposits, removing the deposits in the form of filaments, and forming a thread by superposing and compacting said filaments.

2. Process for making rubber thread which comprises continuously depositing a rubber dispersion in separate grooves, withdrawing moisture from the separate deposits until they are substantially dry but still adhesive, removing the deposits in the form of filaments, and forming a thread by superposing and compacting said filaments.

3. Process for making rubber thread which comprises depositing a rubber dispersion in separate grooves, heating the deposits to withdraw moisture therefrom, removing the deposits in the form of filaments, and forming a thread by superposing and compacting said filaments.

4. Process for making rubber thread which comprises continuously depositing a rubber dispersion in grooves provided on continuously advancing independent surfaces, heating the deposits to withdraw moisture therefrom, removing the deposits in the form of filaments, cooling the filaments, and forming a thread by superposing and compacting said filaments.

5. Process for making rubber thread which comprises depositing rubber dispersions containing various increments of a low temperature vulcanizing compound in separate grooves, withdrawing moisture from the separate deposits, removing the deposits in the form of filaments, and forming a thread by superposing and compacting said filaments.

6. Process for making rubber thread which comprises depositing upon independent surfaces individual deposits of a rubber dispersion containing various increments of a low temperature vulcanizing compound, withdrawing moisture from the separate deposits, superposing and compacting said deposits to form a thread and vulcanizing.

7. Process for making rubber thread which comprises continuously depositing upon independent surfaces individual deposits of a rubber dispersion, different deposits containing an incomplete low temperature vulcanizing combination, withdrawing moisture from the separate deposits superposing and compacting the deposits to form a thread and forming a complete low temperature vulcanizing combination throughout the thread by migration.

8. Process for making rubber thread which comprises continuously depositing individual deposits of a rubber dispersion upon independent surfaces, different deposits containing parts of a complete low temperature vulcanizing combination and the aggregate of the deposits including the entire combination, withdrawing moisture from the separate deposits superposing and compacting the deposits to form a thread and vulcanizing the thread by intermigration of its vulcanizing ingredients.

ERNEST HOPKINSON.